United States Patent [19]

Mashimo

[11] 4,272,170

[45] Jun. 9, 1981

[54] PHOTOGRAPHIC ARRANGEMENT USING VARIOUS ELECTRONIC FLASH DEVICES

[75] Inventor: Yukio Mashimo, Tokyo, Japan

[73] Assignee: Canon Kabushiki Kaisha, Tokyo, Japan

[21] Appl. No.: 23,776

[22] Filed: Mar. 26, 1979

Related U.S. Application Data

[63] Continuation of Ser. No. 784,524, Apr. 4, 1977, abandoned, which is a continuation of Ser. No. 579,881, May 22, 1975, abandoned, which is a continuation of Ser. No. 89,262, Nov. 13, 1970, abandoned.

[30] Foreign Application Priority Data

| | | | |
|---|---|---|---|
| Nov. 20, 1969 | [JP] | Japan | 44-110347 |
| Nov. 20, 1969 | [JP] | Japan | 44-110348 |
| Nov. 20, 1969 | [JP] | Japan | 44-110349 |
| Dec. 25, 1969 | [JP] | Japan | 44-103914 |

[51] Int. Cl.[3] .............................................. G03B 15/05

[52] U.S. Cl. .................................................... 354/149

[58] Field of Search ................. 354/32, 33, 60 F, 127, 354/128, 145, 27, 34, 51, 133, 139, 149, 141

[56] References Cited

U.S. PATENT DOCUMENTS

| | | | |
|---|---|---|---|
| 3,418,904 | 12/1968 | Wick et al. | 354/34 |
| 3,470,798 | 10/1969 | Miyakawa | 354/31 |
| 3,675,547 | 7/1972 | Uchiyama et al. | 354/33 X |
| 3,714,872 | 2/1973 | Mashimo | 354/33 |

*Primary Examiner*—L. T. Hix

*Assistant Examiner*—William B. Perkey

*Attorney, Agent, or Firm*—Toren, McGeady and Stanger

[57] ABSTRACT

In the arrangement disclosed, a photographic camera operates both with an electronic flash that generates a charge completion signal and a flash without a charge completion signal. In the camera, two switching elements shift between a time constant set for the flash with the charge completion signal and a second time for a flash without the charge completion signal. A control signal responds to the time constant circuit to control an exposure in response to the time constant circuit.

14 Claims, 19 Drawing Figures

FIG. 1-a
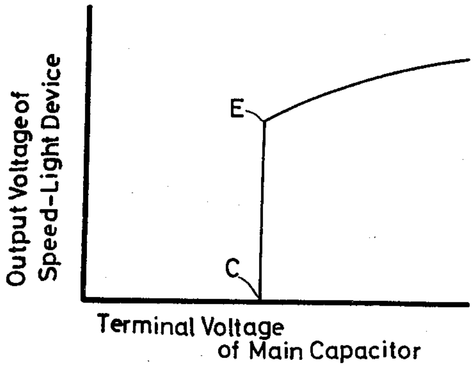
FIG. 1-b
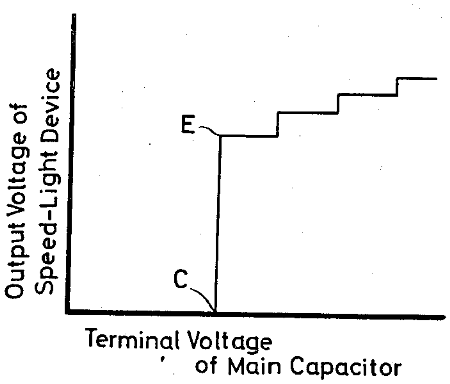
FIG. 2
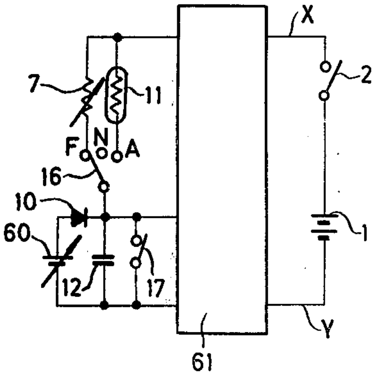
FIG. 3
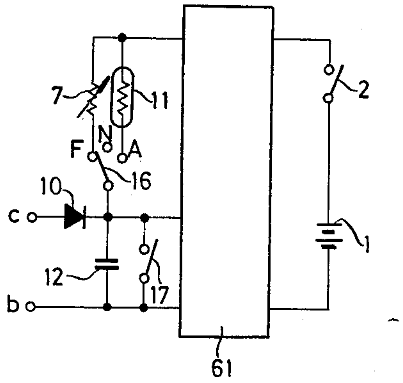
FIG. 4
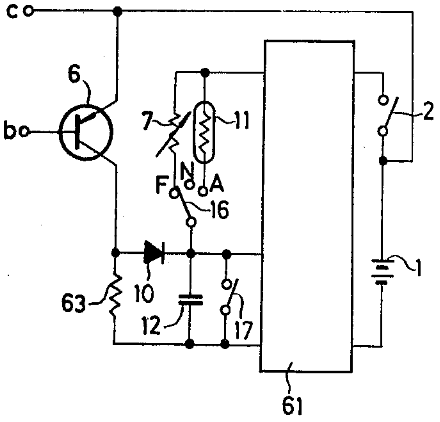

PHOTOGRAPHIC ARRANGEMENT USING VARIOUS ELECTRONIC FLASH DEVICES

This is a continuation of U.S. application Ser. No. 784,524 filed on Apr. 4, 1977 now abandoned; which is a continuation of U.S. application Ser. No. 579,881 filed on May 22, 1975, now abandoned; which is a continuation of U.S. application Ser. No. 089,262 filed on Nov. 13, 1970, now abandoned.

The present invention relates to a camera with a programmed electronic shutter which provides for correction for an underexposure caused by a reduction in the amount of illumination from a speedlight i.e. electronic flash, device.

When taking pictures by flashlight with an electronic flash device, the common practice has been to determine the amount of exposure by using a value for diaphragm aperture which is obtained by dividing the guide number of the electronic flash device by shutter speed. However, a reduction in the source voltage of the speedlight device fails to provide a given guide number, resulting in a failure to obtain proper exposure.

Various devices have been proposed to remove such disadvantage. For example, a camera is proposed which is provided with an automatic charge adjusting device for the main capacitor in the electronic flash device that is used as the energy source for luminous radiation. Another camera proposed comprises an automatic exposure adjusting device which detects the charge on the main capacitor to control the angle of deflection of the pointer of an ammeter.

The camera according to the present invention is of the same kind as the another above-mentioned. And is characterized in that the charging condition of the main capacitor in a electronic flash device is sensed and the value sensed is used to vary RC time constant or to vary the operating point of a time control circuit in accordance with the voltage signal across the main capacitor of an electronic flash device, with a consequent change in the shutter period and diaphragm aperture determined thereby for controlling the amount of exposure. According to another feature of the invention the diaphragm value is set by precharging the capacitor in the RC-network on the basis of the voltage across the main capacitor.

It is a first object of the invention to provide a camera in which the amount of exposure is determined as a function of the charge on the main capacitor of an electronic flash device.

It is another object of the invention to provide a camera in which a capacitor in an RC time constant circuit is previously charged by the voltage signal across the main capacitor of an electronic flash device, and then the amount of exposure is determined by the RC time constant.

Above and other objects, features and advantages of the invention will become apparent from the following description of several embodiments thereof taken in conjuction with the accompanying drawings, in which:

FIG. 1 is a diagram illustrating a photographic flash system.

FIGS. 1*a* and 1*b* show the relation between a terminal voltage across a main capacitor (abscissa) and an output voltage from an electronic flash device (ordinate). FIG. 1*b* shows an output characteristics of a modification of the device shown in FIG. 1.

FIG. 2 is a circuit diagram helpful for illustration of the principle of the embodiments of the invention shown in FIGS. 3–6.

FIGS. 3 to 6 are respective circuit diagrams illustrating embodiments of the invention.

Figure 7:
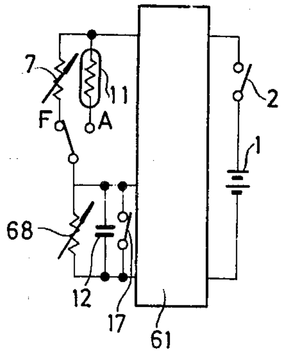
Figure 7:
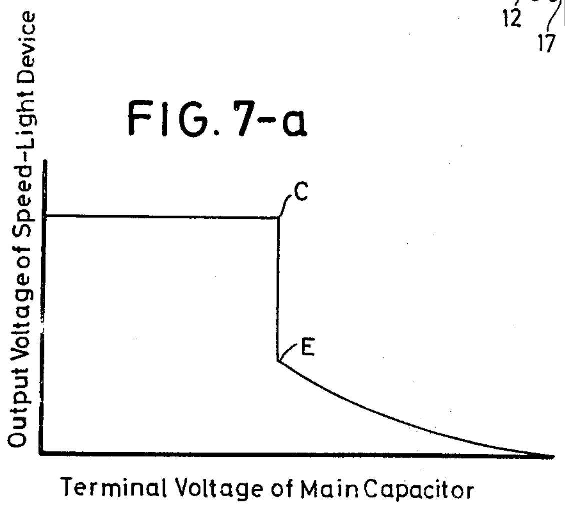
Figure 7:
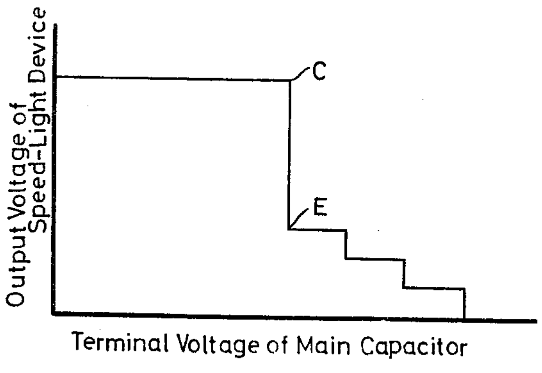
Figure 8:
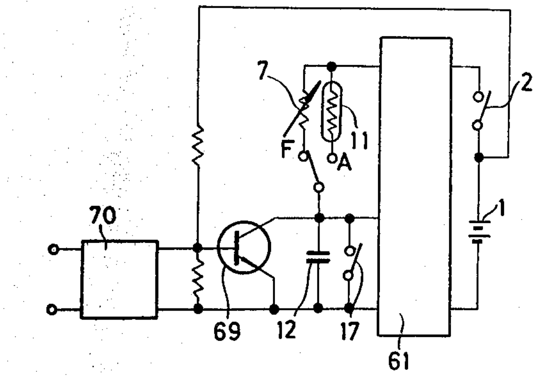
Figure 9:
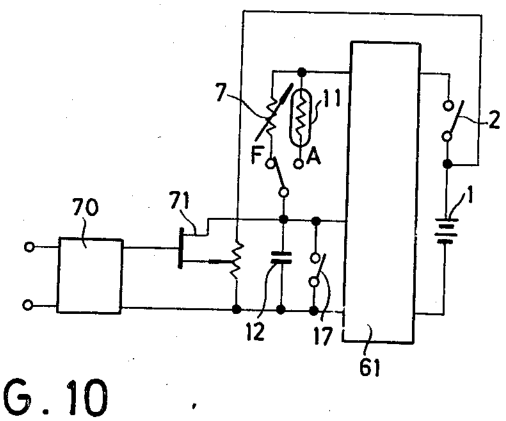
Figure 10:
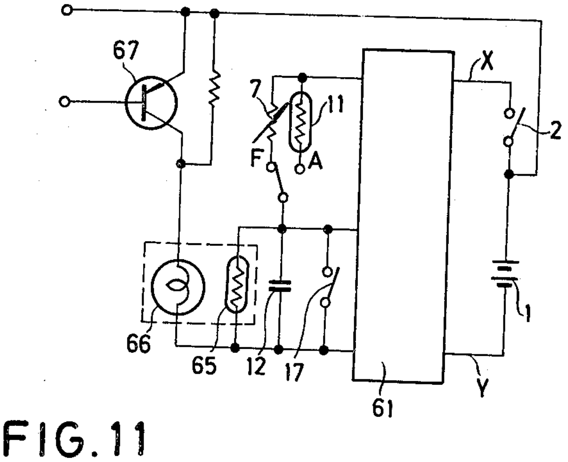

FIG. 7 is a circuit diagram illustrating the principle of other embodiments shown in FIGS. 8 to 10, respectively. FIGS. 7*a* and 7*b* show the relation between a terminal voltage across a main capacitor (abscissa) and an inverted output voltage from an electronic flash device (ordinate). The output characteristics of the main capacitor of the electronic flash device shown in FIG. 7 are represented in FIG. 7*a*, and the output characteristics of a modification of the device shown in FIG. 7 are represented in FIG. 7*b*.

FIGS. 8 to 10 are the circuit diagrams of the other embodiments, respectively.

FIGS. 11–14 are circuit digrams illustrating other photographic flash systems.

Figure 15:
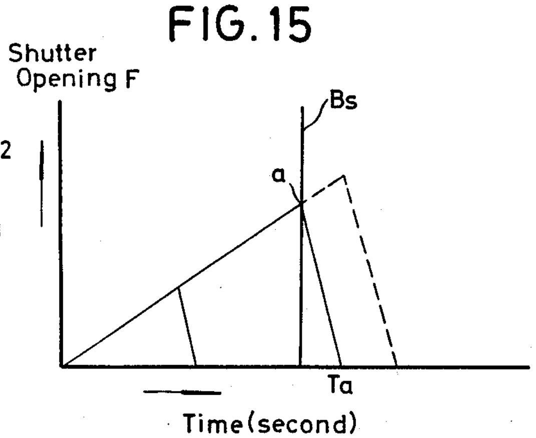

FIG. 15 is a schematic operation diagram of a programmed shutter, in which shutter time is shown on the abscissa and an aperture opening is shown on the ordinate.

Figure 1:
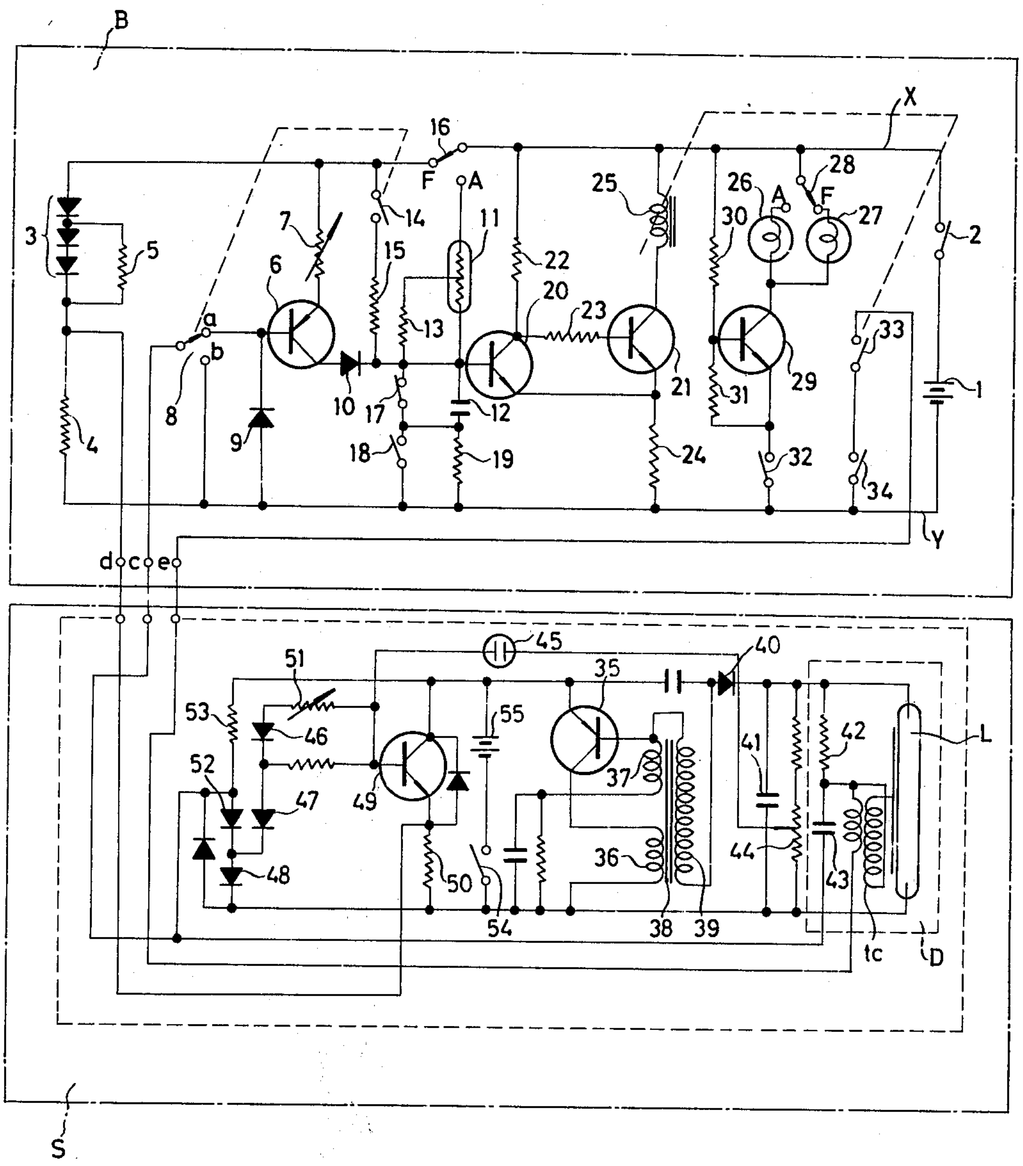

Referring to the drawings, and more particularly to FIG. 1, FIG. 1*a* and FIG. 1*b*, a first embodiment of the invention will be described below. The block enclosed by chain lines B indicates a circuit diagram of the device according to the invention, while the block enclosed by chain lines S denotes a circuit diagram of a speedlight i.e. an electronic flash device. Such device will be referred to hereinafter as an "intrinsic electronic flash device" as distinguished from conventional devices. Referring first to the block B, a power source 1 has its positive terminal connected with a positive line X through a power switch 2 and its negative terminal connected with a negative line Y.

A plurality of diodes 3 are connected in series with a resistor 4 across the supply lines. A part of the diodes 3 is shunted by a resistor 5, and the diodes 3 are provided to stabilize the voltage applied to the base of a transistor 6 that is adapted to be controlled by a signal voltage from the electronic flash device S. The transistor 6 has its base connected with a signal input terminal c from the electronic flash device S through a switch 8 and its emitter connected with the positive line X through a variable resistor 7 that is adpated to incorporate information for taking pictures by flashlight. The collector of the transistor 6 is connected through a diode 10 to one electrode of a capacitor 12. A change-over switch 8 is connected with the terminal c from the electronic flash device S and has two contacts a and b, the contact a being connected with the base of the transistor 6 and the contact b being connected with the negative line Y. This switch 8 normally assumes a position in which the movable contact is connected with the contact b and is moved into contact with the contact a only when the electronic flash device is mounted on the camera body.

A resistor 15 is connected in parallel with the transistor 6, the resistor 15 having its one end connected with the positive line X through a pair of switches 14 and 16 and its other end connected with the one electrode of the capacitor 12. The switch 14 is interlocked with the change-over switch 8, and assumes an open circuit position when the switch 8 is on the contact a and assumes a closed circuit position when the switch 8 is on the contact b. As a result, when the electonic flash device is mounted on the camera body, the time constant circuit including the transistor 6 becomes operative, while when a usual electronic flash device is mounted on the camera body, a constant speed time constant circuit including the resistor 15 becomes operative.

A diode 9 is connected between the base of the transistor 6 and the negative line Y. A three terminal photoconductor element 11 comprises a photometric circuit together with the capacitor 12 when taking pictures in what may be called an electronic eye operation, i.e. an automatic electronic shutter operation which functions to vary the shutter timing automatically in response to the brightness of the subject being photographed. A resistor 13 is connected between the intermediate terminal of the photoconductor element 11 and the junction between the diode 10 and the capacitor 12. This resistor serves extending the operative range covered by the photoconductor element 11. The change-over switch 16 has a normally closed contact A in which it completes said photometric circuit, and another contact F to which the switch is movable to operate the flashlight circuit.

A start switch 17 is connected in parallel with the capacitor 12, and is used in an automatic electronic shutter timing operation so as to be closed during the measurement of light amount and opened simultaneously with the opening of the shutter blades. A resistor 19 is connected between the other electrode of the capacitor 12 and the negative line Y, this resistor also constituting the photometric circuit together with the photoconductor element 11. Another switch 18 is connected across the resistor 19, this switch being opened during measurement of light amount in order for the photometric circuit comprising the photoconductor element 11 and the resistor 9 to operate and being closed when taking pictures in an automatic electronic shutter timing operation and taking pictures by flashlight.

A pair of transistors 20 and 21 consititute a switching circuit. The transistor 20 has its base connected with the contact A of the change-over switch 16 through the photoconductor element 11, and its collector connected with the positive line X through a resistor 22. The emitter of the transistor 20 is connected together with the emitter of the transistor 21 to the negative line Y through a resistor 24. The transistor 21 has its base connected with the collector of the transistor 20 through a resistor 23, and its collector connected with the positive line X through an electromagnet 25. The electromagnet 25 operates upon conduction of the transistor 21 so as to attract the shutter closing member (not shown) and close the shutter after a period of time Ta (FIG. 15). Parts designated by reference numerals 26 to 32 are components used in an indicator circuit that indicates whether an automatic electronic shutter timing photograph or flashlight photograph is to be taken. Specifically, reference numerals 26 and 27 denote indicator lamps diposed within the finder of the camera body and arranged to be alternatively connected in the circuit by a change-over switch 28. The switch 28 which is mechanically associated with the change-over switch 16, has a contact A in which position it connects the lamp 26 in the circuit to indicate an automatic electronic shutter timing photography, and a contact F in which position it connects the lamp 27 in the circuit to indicate a flashlight photographing. These lamps are connected with the collector of a transistor 29 having its base connected with the junction between a pair of resistors 30 and 31 which are connected in series with a switch 32 across the supply lines. The switch 32 is closed in association with the power switch 2 and is opened in association with either the power switch 2 or the start switch 17. Reference numerals 33 and 34 denote a circuit of synchronizing contacts. The contacts 33 and 34 are interlocked with the electromagnet so as to be closed immediately before the shutter is closed. Numeral 34 denotes a mechanical synchronizing contact.

Referring now to the block S which shows an electronic flash device, a transistor 35 has its collector connected with one end of a primary winding 36 of a transformer 38 and its base connected with one end of a feedback winding 37 on the transformer in a manner to constitute an oscillator circuit. The secondary winding 39 of the transformer has its one end connected with said one end of the feedback winding 37 and its other end connected through a rectifier element 40 with a main discharge capacitor 41. A block D shown by broken lines represents a discharge circuit for a flash lamp L. The discharge circuit D includes a trigger coil to connected with the junction between a resistor 42 and a trigger capacitor 43 that is charged through the resistor 42. One end of the trigger coil L is connected so as to trigger the flash lamp L into conduction, while the other end thereof is connected through a terminal e with the synchronizing contact circuit 33, 34 provided in the camera body. The capacitor 43 has its electrode remote from the resistor 42 connected with the terminal c. A control circuit is provided which comprises a variable resistor 44 connected in parallel with the main capacitor 41, with movable point of the resistor 44 being connected through a neon discharge lamp 45 to the base of a transistor 49. The transistor 49 has its collector connected with the positive terminal of a battery 55 and its emitter connected with the negative terminal thereof through an emitter resistor 50 and a power switch 54 in series. A series of diodes 46, 47 and 48 are connected in series with a variable resistor 51 and the resistor 50 across the base and an emitter of the transistor 49. The adjustment of the variable resistor 51 provides means to correct the voltage drop across the emitter resistor 50. The emitter of the transistor 49 is also connected with the terminal d. The diodes 46, 47 and 48 serve compaction of the voltage variation across the main capacitor 41 and compensation of the rising time of the voltage across the base and an emitter of the transistor 49. A constant voltage diode 52 and a bias resistor 53 are connected in series with the diode 48 across the series connection of the switch 54 and the battery 55. The resistor 53 is chosen so as to provide a predetermined voltage across the diodes 52 and 48. When the power switch 54 is turned off, the electronic timer circuit may be disconnected from the control of the flash device. For further details of the intrinsic electronic flash device S, U.S. Patent Application Ser. No. 27,699 of Apr. 13, 1970 may be referred to.

Since the intrinsic electronic flash device S is arranged as mentioned above, the voltage across the main discharge capacitor 41 appears across the terminals c and d. FIG. 1*a* shows the output voltage or the voltage across the terminals c and d as a function of the terminal voltage of the main discharge capacitor. The output voltage remains zero for a voltage across the main capacitor 41 which is insufficient to cause illumination of the flash discharge tube L. The output voltage rises stepwise from point C to point E when the voltage across the main capacitor 41 sufficiently increases to permit an illumination of the flash tube, and subsequently undergoes a gradual increase with the increase of the voltage across the main capacitor. FIG. 1*b* shows a modification in which the variation of the output voltage subsequent to the voltage level E is stepwise. For further details of circuit constructions for the above output characteristics, U.S. Patent Application Ser. No. 27,699 may be referred to.

The operation of the device described above is as follows:

When taking pictures in an automatic photographing mode, the change-over switches 16 and 28 are in their position to complete the circuit through their contact A, the switch 17 is closed and the switch 18 is open under this situation, the depression of a shutter lever (not shown) to a first step causes the power switch 2 to be closed, whereby the photometric circuit comprising the photoconductor element 11 and resistor 19 becomes operative to determine if an automatic photographic operation is possible. Where such automatic photographing has been determined to be possible (this is indicated by the illumination of the lamp 26), the shutter lever (not shown) is pushed to move to the second step, whereby the shutter blades (not shown) start to open as indicated in FIG. 15. Simultaneously with the opening of the shutter blades, the switch 17 is opened while the switch 18 is closed. Then the time constant circuit comprising the photo-conductor element 11 and capacitor 12 becomes operable, and after a given period of time, the electromagnet 25 is operated to cause a shutter closing member (not shown) to close, thereby completing an exposure. In case when the photometric circuit determined that usual photographing is not suitable, the photographer moves the change-over switches 16 and 28 from contact A to contact F. This switching can be made either manually, or automatically by means not shown. The the electronic flash device S is mounted on the camera body, with the respective terminals c, d and e connected with the circuit within the camera. Because the electronic flash device S is used, the change-over switch 8 is moved to complete a circuit with the contact a. The neon lamp 45 in the electronic flash device S is lit, and when the main capacitor 41 is completely charged, the output voltage from the electronic flash device is applied to the base of the transistor 6. Depression of the shutter lever (not shown) to the second step under this condition, the capacitor 12 is charged through a path comprising the resistor 7 and the transistor 6. The time required for the capacitor 12 to be charged is determined by the sum of the resistance of the variable resistor 7 and the output resistance of the transistor 6. The lower the voltage applied to the base of the transistor 6 from the electronic flash device S, the lower the output resistance of the transistor 6 and hence the shorter the charging period of the capacitor 12, and vice versa. After integration by the RC time constant circuit, the conduction of the transistors 20 and 21 is reversed, whereby the electromagnet 25 is operated to drive the shutter closing member (not shown). The position in time at which the electromagnet 25 is operated is shown at oa in FIG. 15, and in synchronism therewith, the synchronizing contacts 33 and 34 are closed to cause an illumination of the discharge tube L in the electronic flash device.

For a flash photographing with a conventional type of an electronic flash device, the switch 8 is on the contact b and the switch 14 in association with the switch 8 is closed. Therefore, the time constant circuit including the transistor 6 is not operative, but the time constant circuit including the resistor 15 is operative, whereby a constant shutter speed and a constant aperture are obtained.

FIG. 2 illustrates the principle of the other embodiments of the invention. Referring to this Figure, a battery 60 of variable voltage is used in these embodiments as an equivalent means to the circuit including transistor 6 shown in FIG. 1. The capacitor 12 is connected in series with the diode 10 across the battery 60. The change-over switch 16 is modified from the previous embodiment in that it is a three-position switch and includes neutral position or contact N. The switch 16 is interlocked with a shutter lever (not shown), and initially assumes the neutral position N and then moves to contact the contact F. The contacts F and A are connected with the positive line X through the variable resistor 7 and the photoconductor element 11, respectively. The switch 17 is provided as before to shunt the capacitor 12. A block designated by the numeral 61 represents the switching circuit which has been shown in FIG. 1 as comprising components 20 to 25.

The operation of the circuit of FIG. 2 when taking pictures by flashlight is a follows: depression of a shutter lever (not shown) to a first step causes the switch 16 to move to the contact N, and the capacitor 12 is charged by the battery 60. Depression of the shutter lever (not shown) to a second step causes the switch 16 to move to the contact F, whereupon the time constant circuit comprising the resistor 7 and the capacitor 12 becomes operative. Subsequent operation is similar to that described in connection with the first embodiment. Thus, with the arrangement of FIG. 2, it is possible to apply the information of variable voltage battery 60 into the capacitor 12 before the RC time constant circuit is operative. The integration by the RC time constant circuit depends on such information, thereby enabling the shutter speed and diaphragm aperture to be varied with the information supplied from the variable voltage battery 60 and thus permitting a proper exposure which corresponds to the amount of illumination emitted from the electronic flash device.

Referring to FIG. 3, a specific application of the circuit shown in FIG. 2 will be described. The embodiment shown in FIG. 3 is arranged such that the capacitor 12 is directly charged by the variable output from the electronic flash device as shown in FIG. 1*a* and originating at main capacitor 41 in the speedlight device S.

Referring to FIG. 4 which shows another embodiment, the voltage signal from the electronic flash device S is applied to the base of the transistor 6. The numeral 63 is a bleeder resistor for the battery 60 . Hence, when the change-over switch 16 assumes its neutral position N, the capacitor 12 is charged through the transistor 6, the amount of charge thereon being determined by the terminal voltage of the main capacitor 41 in the electronic flash device. This changes the integration by the RC circuit 7, 12, thereby adjusting the amount of exposure permitted through the shutter.

Figure 5:
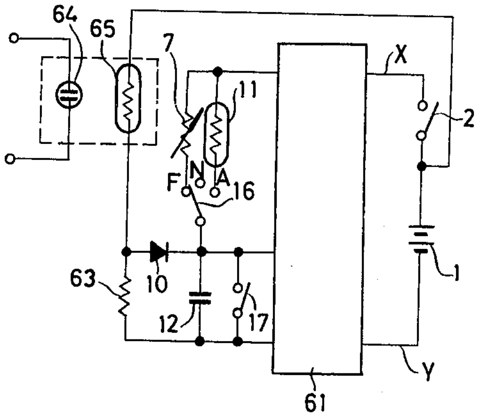

Referring to FIG. 5 which shows another embodiment, the output from the electronic flash device S is used to illuminate a neon discharge tube 64, the latter being disposed so that light from the tube impinges upon a photoconductor element 65 to cause a change in its resistance that is connected in the circuit to charge the capacitor 12.

Figure 6:
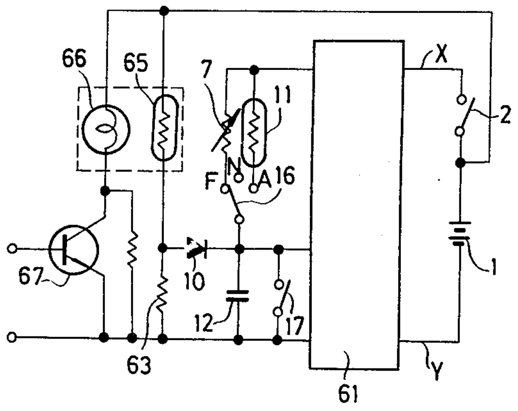

Referring to FIG. 6 which shows another embodiment, a photoconductor element 65 is disposed for illumination by a miniature lamp 66 that varies its illuminance in accordance with the voltage applied to the base of a transistor 67. The output characteristics of the embodiments shown in FIGS. 2 to 6 are shown in either FIG. 1*a* or FIG. 1*b*.

Another series of embodiments with an inverted output as contrast to the embodiments shown in FIGS. 2 to 6 are shown in FIGS. 7 to 10, FIG. 7 illustrating the basic principle. In FIG. 7, a variable resistor 68 is connected across the capacitor 12, and the adjustment of its resistance results in a change in the integration period of the RC time constant circuit comprising the capacitor 12 and the resistor 7, thereby allowing a control over the shutter speed and diaphragm aperture. A specific example in which the principle above described is applied is shown in FIG. 8 as another embodiment. In FIG. 8, a block 70 indicates an inverter which provides the inversion of the output voltage from the flash device shown in FIG. 2. A shown in FIG. *7a,* when the voltage across the main capacitor 41 is insufficient to an illumination of the flash discharge tube L, there results a low resistance (short-circuit) condition, and as the voltage across the main capacitor reaches a level capable of causing an illumination of the flash tube. The output of the inverter 70 varies stepwise from point C to point E, and thereafter decreases gradually with the subsequent increase of the terminal voltage of the main capacitor 41. FIG. 7*b* corresponds to the modification shown in FIG. 1*b*. The output voltage of the inverter 70 is applied to the base of a transistor 69 to change its conduction level or resistance. As a consequence, the integration period by the RC time constant circuit varies with the charging information of the main capacitor 41, thereby enabling a control over the shutter speed and diaphragm aperture.

In a seventh embodiment shown in FIG. 9, the transistor 69 in the sixth embodiment is replaced by a field effect transistor 71.

In FIG. 10 which shows an eighth embodiment, the output from the speedlight device S is applied to the base of a transistor 67 which is in the circuit to illuminate a miniature lamp 66, the varying illumination from the lamp 66 causing a change in the resistance of a photoconductor element 65.

Figure 11:
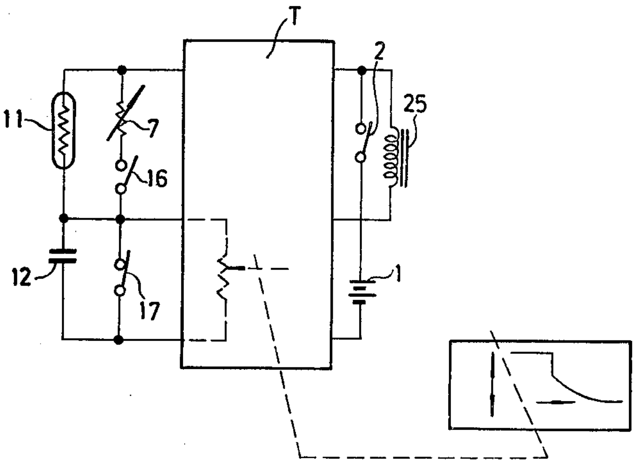
Figure 12:
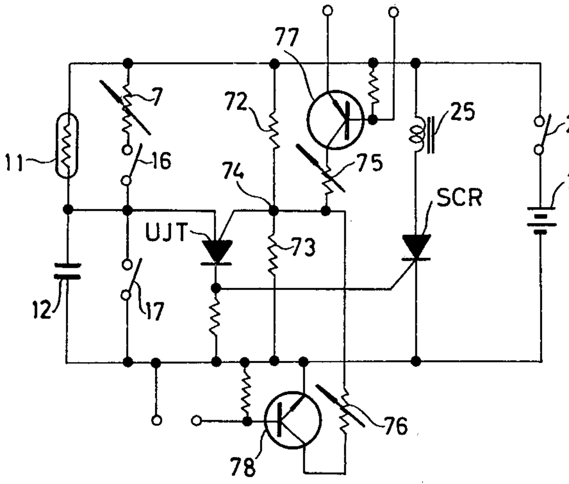
Figure 13:
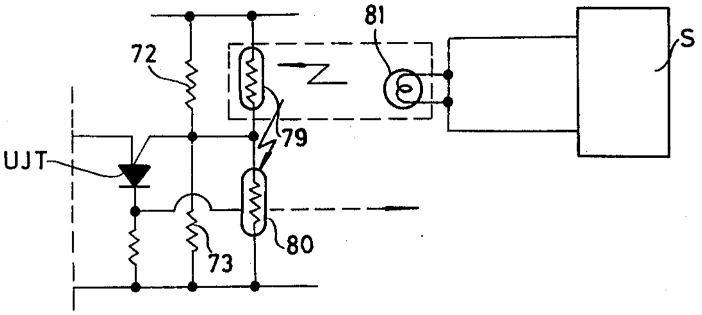
Figure 14:
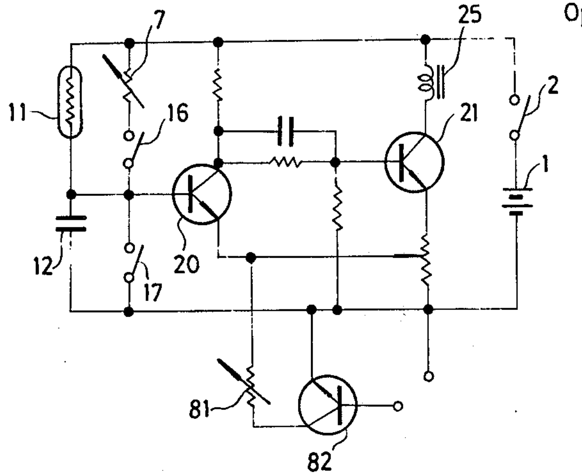

FIG. 11 illustrate a still different principle for ninth to eleventh embodiments shown in FIGS. 12 to 14, which provides an adjustment of the operating point of a time control circuit T in accordance with the signal from the speedlight device (see FIG. *7a*), thereby allowing a control over the shutter speed and diaphragm aperture.

In the embodiment of FIG. 12, the time control circuit 62 comprises a uni-junction transistor UJT and a silicon controlled rectifier SCR. The capacitor 12 is connected to one base of the uni-junction transistor, the other base of which is connected to the junction between a pair of resistors 72 and 73 connected in series across the supply lines. The junction 74 is supplied with the signal from the speedlight device S (FIG. *7a*) either through a variable resistor 75 and a transistor 77 or through a variable resistor 76 and a transistor 78. The emitter of the uni-junction transistor UJT is connected through a resistor with the negative supply line and is also connected with the gate electrode of the rectifier SCR that is connected in series with the electromagnet 25 across the supply lines. In operation, when taking pictures by flashlight, the switch 16 is closed and a shutter lever (not shown) is depressed to close the power switch 2. Further depression of the shutter lever causes the shutter blades to be opened, and simultaneously therewith, the switch 17 is opened, causing the capacitor 12 to be charged through the resistor 7 to initiate the timing control. When the voltage across the capacitor 12 reaches a predetermined level established by either transistor 77 or 78, the uni-junction transistor produces a pulse to render the silicon controlled rectifier into conduction, whereby the shutter blades start to close. In synchronism with the closing motion of the shutter blades, the flash tube L in the speedlight device S is activated for illumination. In the arrangement mentioned above, a change in the resistance of the resistor 75 or 76 provides means to control the voltage level at which the uni-junction transistor becomes operative, and hence by providing the input terminal of the transistor 77 or 78 with the signal from the speedlight device S, the voltage level at which the uni-junction transistor becomes operative can be varied, thereby controlling the period of time before the electromagnet 25 is deenergized.

In the tenth embodiment shown in FIG. 13, the transistors 77 and 78 of FIG. 12 are replaced by photoconductor elements 79 and 80 which are connected in parallel with the resistors 72 and 73 of FIG. 12, respectively. The photoconductor elements 79 and 80 are disposed to be illuminated by a miniature lamp 81 that varies its illuminance in accordance with the signal from the speedlight device.

Referring to FIG. 14 which shows an eleventh embodiment, this embodiment employs transistors 20 and 21 which together constitute a Schmitt trigger circuit. The Schmitt trigger circuit is supplied with the signal from the speedlight device through a resistor 81 and a transistor 82.

The output characteristics of the embodiments shown in FIGS. 11 to 14 may be referred to FIGS. 1*a,* 1*b* or 7*b*.

What is claimed:

1. A photographic flash system comprising:

(A) a first electronic flash device including: a flash tube, capacitor means coupled to the tube for storing electrical energy to sustain a flash in said flash tube, charger means connected to said capacitor means for charging said capacitor means, and detecting means connected to said capacitor means for generating a control signal when the charge of the capacitor means has reached a predetermined value, (B) a second electronic flash device including: a flash tube, capacitor means coupled to the tube for storing electrical energy to sustain a flash in said flash tube, and charger means connected to said capacitor means for charging said capacitor means, and (C) a photographic camera, comprising a shutter speed forming circuit and a control circuit connected to an output terminal of said shutter speed forming circuit so as to control an exposure value in correspondence to an output signal from said shutter speed forming circuit, said shutter speed forming circuit including:

first means having first exposure parameter means for generating an output signal corresponding to a shutter speed suitable for the first electronic flash device, and semiconductive switching means for enabling the first exposure parameter means in the shutter speed forming circuit in response to the control signal from said detecting means when the first electronic flash device is attached on the photographic camera, second means having second exposure parameter means for generating a second output signal corresponding to a shutter speed suitable for the second electronic flash device, and selecting switch means for enabling the second exposure parameter means and for disabling the first exposure parameter means when the second electronic flash device is used with the camera, the selecting switch means and the semiconductive switching means being operable alternately so as to allow the shutter speed forming circuit to produce only one of a first output and a second output so that a flash produced by the first flash device and the second flash device is based on the shutter speed determined by the first parameter means and the second parameter means respectively.

2. A photographic flash system according to claim 1, wherein said semiconductive switching means includes a transistor connected to the first exposure parameter means.

3. A photographic flash system according to claim 1, wherein said semiconductive switching means includes a PNP transistor having a base electrode and a collector electrode.

4. A photographic camera both for a first electronic flash device with charge completion signal generating means and for a second electronic flash device without the charge completion signal generating means, comprising:

(A) a time constant circuit which includes:

a time exposure parameter means having a first switching element, said first exposure parameter means producing an output signal corresponding to a shutter speed suitable for the first electronic flash device, second exposure parameter means having a second switching element connected to said first exposure parameter means, said second exposure parameter means producing an output signal corresponding to a shutter speed suitable for the second electronic flash device, and capacitive means connected in series with the first and second exposure parameter means, said first switching element being responsive to an output signal from charge completion generating means in the first electronic flash device to enable said first exposure parameter means when said first electronic flash device is attached, and said second switching element being arranged for disabling said second exposure parameter means only when said first electronic device instead of when the second electronic flash device is attached, and for enabling said second exposure parameter means when the second electronic flash device is attached, (B) a control circuit connected to an output terminal of the time constant circuit to control an exposure value in response to an output from said time constant circuit so that only one of said first exposure parameter means and said second exposure parameter means are enabled to produce one of said first output and said second output independently for determining the shutter speed suitable for flash photography with the first electronic flash device or the second electronic flash device.

5. A photographic camera according to claim 4, wherein said first switching element includes a transistor for enabling said first exposure parameter means when the output signal from said charge completion generating means is applied to the transistor.

6. A photographic camera according to claim 4, wherein said second switching element includes a mechanical switching element which is closed upon the attachment of said second electronic flash device.

7. A photographic camera according to claim 4, wherein said capacitive means consists of a timing capacitor.

8. A photographic camera according to claim 4, wherein the input terminal of said control circuit is connected with the junction of said capacitive means and said first exposure parameter means.

9. A photographic camera according to claim 8, wherein said control circuit includes a Schmitt trigger circuit having a first stage for detecting the charge level of said capacitive means.

10. A photographic camera according to claim 4, wherein the input terminal of said control circuit is connected with the junction of said capacitive means and said second exposure parameter means, wherein said camera includes connector means connectable to a power source for use in the camera, and wherein said second parameter means is connected to said connector means.

11. A photographic camera according to claim 9, wherein said control circuit includes a Schmitt trigger circuit having a first stage for detecting the charge level of said capacitive means.

12. A photographic camera both for a first electronic flash device with charge completion signal generating means and for a second electronic flash device without charge completion signal generating means, comprising:

(A) a capacitor, (B) a first series circuit connected in series with said capacitor to form a time constant circuit suitable for the first electronic flash device, said first series circuit including first exposure factor setting resistor means, and semi-conductor switching means, which is connected in series with the first exposure factor setting means and for connecting the first resistor means to the capacitor so as to form a time constant circuit in response to the completion signal generating means when said first electronic flash device is attached to said camera, (C) a second series circuit connected in series to said capacitor to form a time constant circuit suitable for the second electronic flash device instead of the first electronic flash device when attached to said camera, said second series circuit having second exposure factor setting resistor means and second switching means which is connected in series to the second exposure factor setting means to said capacitor for forming a second time constant circuit, the second switching means being operative to the switched on during flash photography by the second electronic flash device and is inoperative to be switched off during flash photography by the first electronic flash device, and (D) a control circuit connected to said capacitor to control a shutter speed based on said first time constant circuit in response to the charge level of said capacitor and said second time constant circuit instead of the first time constant circuit when said second electronic flash device is used.

13. A photographic camera according to claim 12, wherein said semi-conductor switching means consist of a transistor having an emitter electrode connected to said first exposure factor setting means, a collector electrode connected to said capacitor and a base electrode.

14. A photographic camera according to claim 13, wherein the second switching means further comprises: third switching means connected between the base electrode of said transistor and the charge completion signal generating means of said first electronic flash device upon attachment of said first electronic flash device, wherein said camera includes connector means connectable to a power source for use in the camera, and wherein said second parameter means is connected to said connector means.

* * * * *